United States Patent
Kuroiwa et al.

(10) Patent No.: US 11,391,338 B2
(45) Date of Patent: Jul. 19, 2022

(54) SHOCK ABSORBER

(71) Applicant: Showa Corporation, Gyoda (JP)

(72) Inventors: Naoya Kuroiwa, Fukuroi (JP); Yosuke Fujikawa, Fukuroi (JP); Yosuke Murakami, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 54 days.

(21) Appl. No.: 16/791,441

(22) Filed: Feb. 14, 2020

(65) Prior Publication Data

US 2020/0182325 A1 Jun. 11, 2020

Related U.S. Application Data

(63) Continuation of application No. PCT/JP2017/038971, filed on Oct. 27, 2017.

(30) Foreign Application Priority Data

Oct. 18, 2017 (JP) .............................. JP2017-201850

(51) Int. Cl.
*F16F 13/00* (2006.01)
*F16F 9/32* (2006.01)
(Continued)

(52) U.S. Cl.
CPC .......... *F16F 13/007* (2013.01); *F16F 9/3292* (2013.01); *F16F 9/38* (2013.01);
(Continued)

(58) Field of Classification Search
CPC ...... F16F 13/005; F16F 13/007; F16F 9/3292; F16F 9/38; F16F 2230/0023;
(Continued)

(56) References Cited

U.S. PATENT DOCUMENTS 5,218,308 A * 6/1993 Bosebeck ........ B60G 17/01933
324/207.16
8,253,281 B2 * 8/2012 Namuduri ............ H02K 7/1876
310/23
(Continued)

FOREIGN PATENT DOCUMENTS

EP 3067666 A1 9/2016
JP 60-008104 A 1/1985
(Continued)

OTHER PUBLICATIONS

International Search Report dated Dec. 5, 2017 for the corresponding PCT International Application No. PCT/JP2017/038971.
Extended European Search Report dated Jun. 29, 2021 for the corresponding European Patent Application No. 17929248.7.

*Primary Examiner* — Xuan Lan Nguyen
(74) *Attorney, Agent, or Firm* — Leason Ellis LLP

(57) ABSTRACT

A shock absorber includes a cylinder which is a conductor; a rod inserted into the cylinder from one end side of the cylinder, a suspension spring arranged outside the cylinder, a spring receiver which receives a load of the suspension spring on the one end side of the rod, and a protective member arranged on the one end side of the rod and configured to protect the rod. The protective member has a coil configured to detect a relative position between the cylinder and the protective member, and an end portion formed on the one end side of the protective member is arranged so as not to receive a load from the spring receiver.

20 Claims, 5 Drawing Sheets

(51) Int. Cl.
   *F16F 9/38*   (2006.01)
   *B62K 25/10*  (2006.01)
   *B62K 25/28*  (2006.01)

(52) U.S. Cl.
   CPC .... *B60G 2202/312* (2013.01); *B60G 2300/12* (2013.01); *B60G 2800/162* (2013.01); *B62K 25/10* (2013.01); *B62K 25/28* (2013.01); *F16F 2230/0023* (2013.01); *F16F 2230/0047* (2013.01); *F16F 2230/08* (2013.01); *F16F 2232/08* (2013.01); *F16F 2234/02* (2013.01)

(58) Field of Classification Search
   CPC ........... F16F 2230/08; F16F 2230/0047; F16F 2232/08; F16F 2234/02; B60G 2202/312; B60G 2300/12; B60G 2800/162; B62K 25/10; B62K 25/28
   See application file for complete search history.

(56) References Cited

U.S. PATENT DOCUMENTS

| | | | | |
|---|---|---|---|---|
| 8,672,334 | B1* | 3/2014 | Murakami | B60G 17/016 |
| | | | | 280/5.514 |
| 8,783,696 | B2* | 7/2014 | Murakami | B60G 13/08 |
| | | | | 280/5.514 |
| 9,004,500 | B2* | 4/2015 | Murakami | B62K 25/08 |
| | | | | 280/5.514 |
| 2016/0265943 | A1 | 9/2016 | Murakami | |
| 2016/0265945 | A1 | 9/2016 | Murakami | |

FOREIGN PATENT DOCUMENTS

| | | |
|---|---|---|
| JP | 2006-144952 A | 6/2006 |
| JP | 2008-095825 A | 4/2008 |
| JP | 2016-165984 A | 9/2016 |
| JP | 2016-166845 A | 9/2016 |
| WO | WO-2013/066158 A1 | 5/2013 |

* cited by examiner

SHOCK ABSORBER

CROSS-REFERENCE TO RELATED APPLICATIONS

This application is a continuation of International Application No. PCT/JP2017/038971 filed on Oct. 27, 2017, which claims the benefit of priority to Japanese Patent Application No. 2017-201850 filed on Oct. 18, 2017, the contents of which are incorporated herein by reference.

TECHNICAL FIELD

The present invention relates to a shock absorber which absorbs shock.

BACKGROUND ART

PTL 1 and 2 disclose a stroke sensor system including a movement amount deriving unit which obtains a movement amount when a cylinder and a rod inserted into the cylinder move relatively. In the stroke sensor system, a protective member (guide) is provided to protect the rod and a coil for obtaining the movement amount is provided inside the protective member.
PTL 1: JP-A-2016-165984
PTL 2: JP-A-2016-166845

SUMMARY OF INVENTION

In the inventions described in PTL 1 and 2, the protective member is arranged at a position where the protective member receives a load of a suspension spring. When the inventors of the invention actually manufactured and tested a shock absorber having the same structure as the inventions of PTL1 and 2, from the viewpoint of increasing the durability of the coil in the protective member, it has been found that it is preferable to prevent the load of the suspension spring from being applied to the protective member.

An object of the invention is to provide a shock absorber which can protect a protective member with a coil from a load of a suspension spring.

According to an aspect of the invention, there is provided a shock absorber which includes a cylinder which is a conductor, a rod inserted into the cylinder from one end side of the cylinder, a suspension spring arranged outside the cylinder, a spring receiver which receives a load of the suspension spring on the one end side of the rod, and a protective member arranged on the one end side of the rod and configured to protect the rod. The protective member has a coil configured to detect a relative position between the cylinder and the protective member, and an end portion formed on the one end side of the protective member is arranged so as not to receive a load from the spring receiver.

According to the aspect of the invention, the protective member having the coil can be protected from the load of the suspension spring.

DESCRIPTION OF EMBODIMENTS

Embodiment 1

An embodiment of the invention will be described below.
<Configuration of Shock Absorber 1>
A shock absorber 1 is provided in a vehicle, for example, a motorcycle. The shock absorber 1 is preferably used particularly for buffering an impact received from a road surface between a rear axle of a vehicle and the vehicle body. Further, in the shock absorber 1, a vehicle body side (the other end side) and an axle side (one end side) are fixed. In the following description, a direction from the vehicle body side to the axle side (or the opposite direction) is referred to as an axial direction.

Figure 1:
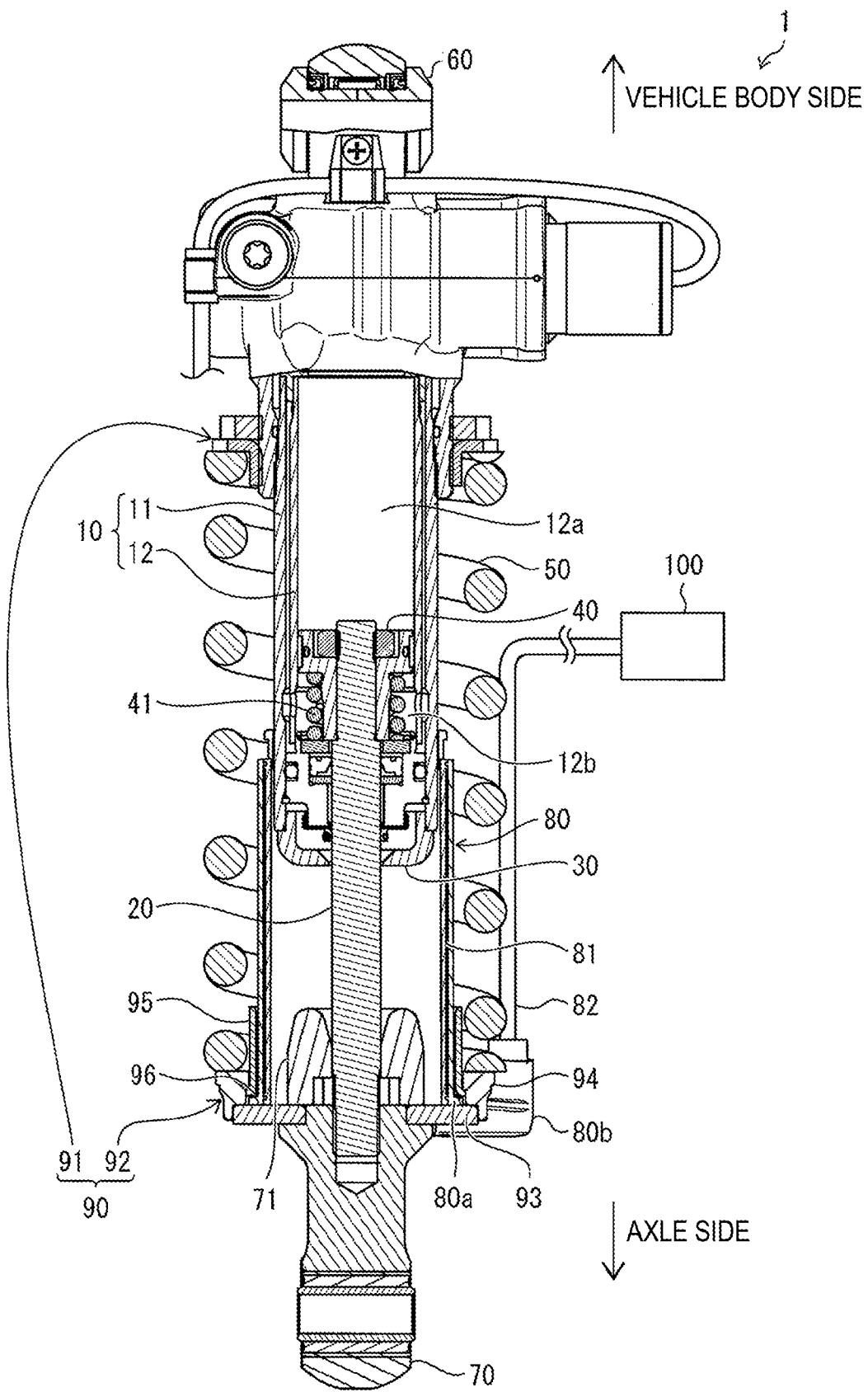
FIG. 1 is a cross-sectional view illustrating a configuration of a shock absorber according to a first embodiment.

FIG. 1 is a cross-sectional view illustrating a configuration of the shock absorber 1 according to the embodiment. The shock absorber 1 constitutes a part of a stroke sensor system 101 (see FIG. 5) in which the stroke amount of the shock absorber 1 is measured by a stroke measuring device 100. As illustrated in FIG. 1, the shock absorber 1 includes a cylinder 10 (conductor), a piston rod 20 (rod), a rod guide 30, a piston 40, a suspension spring 50, an attachment member 60, an attachment member 70, a protector 80 (protective member), and a spring receiving mechanism 90.

The cylinder 10 is a cylindrical member extending in an axial direction of the shock absorber 1. The cylinder 10 is made of a conductive material and functions as a conductor. In addition, the cylinder 10 is constituted by a double pipe of an outer cylinder 11 and an inner cylinder 12. The vehicle body side end portions of the outer cylinder 11 and the inner cylinder 12 are closed and fixed to the attachment member 60. The rod guide 30 is fixed to an opening portion of the axle-side end portion of the outer cylinder 11. A predetermined interval for oil to flow in is provided between the outer cylinder 11 and the inner cylinder 12.

The piston rod 20 is a rod-shaped member extending in the axial direction of the shock absorber 1 and is inserted into the cylinder 10 together with piston 40, and further axially moved in cylinder 10. The piston rod 20 is connected with the piston 40 at the end portion on the vehicle body side and with the attachment member 70 at the end portion on the axle side.

The rod guide 30 is a member which makes the piston rod 20 penetrate therethrough and supports the piston rod 20 and is fluid-tightly fixed to the inner periphery of the axle-side end portion of the outer cylinder 11 of the cylinder 10. A bump rubber 71 is disposed around the axle-side end portion of the piston rod 20. The bump rubber 71 absorbs the shock when an axle-side end surface of the rod guide 30 comes into contact with the attachment member 70 when the shock absorber 1 is most compressed in the compression stroke.

The piston 40 partitions the inside of the inner cylinder 12 into an oil chamber 12a and an oil chamber 12b and slides on the inner surface of the inner cylinder 12. In addition, around the piston rod 20 between the piston 40 and the rod guide 30, there is provided a rebound spring 41 which regulates the expansion side stroke of the shock absorber 1.

The suspension spring 50 absorbs vibration that the rear wheel of the vehicle receives due to the unevenness of the road surface by expanding and contracting. The suspension spring 50 is disposed outside the cylinder 10 and the protector 80. The axial position of the suspension spring 50 is determined by being supported by the spring receiving mechanism 90 described below.

The attachment member 60 is a member for attaching the shock absorber 1 to the vehicle body and is coupled to the cylinder 10 so as to cover the outer periphery of the vehicle-body-side end portion of the outer cylinder 11. The attachment member 60 is formed of a nonferrous metal (nonmagnetic material) such as aluminum.

The attachment member 70 is a member for attaching the shock absorber 1 to the axle and supports the axle-side end portion of the protector 80. In addition, a female screw is formed at a vehicle-body-side end portion of the attachment member 70. This female screw is screwed with a male screw provided at the axle-side end portion of the piston rod 20.

The protector 80 forms a cylindrical shape extending in the axial direction of the shock absorber 1 and is, for example, a cylindrical member made of resin. The protector 80 is provided to cover the exposed portion of the piston rod 20 in order to protect the piston rod 20 from flying pebbles and the like. Inside the protector 80, a coil 81 is provided from a vehicle-body-side end portion of the protector 80 to an axle-side end portion. The coil 81 is provided to measure the stroke amount (the relative position between the cylinder 10 and the protector 80).

The protector 80 has an inner diameter larger than the outer diameter of the outer cylinder 11 of the cylinder 10 so as to receive at least a part of the cylinder 10 from the vehicle body side to the inside. The inner periphery of the protector 80 and the outer cylinder 11 of the cylinder 10 move relative to each other while in contact with each other. Therefore, the axial length (fitting length) in which the inner periphery of the protector 80 and the outer cylinder 11 of the cylinder 10 fit changes. By measuring this fitting length with the stroke measuring device 100, the stroke amount of the shock absorber 1 can be measured.

Figure 2:
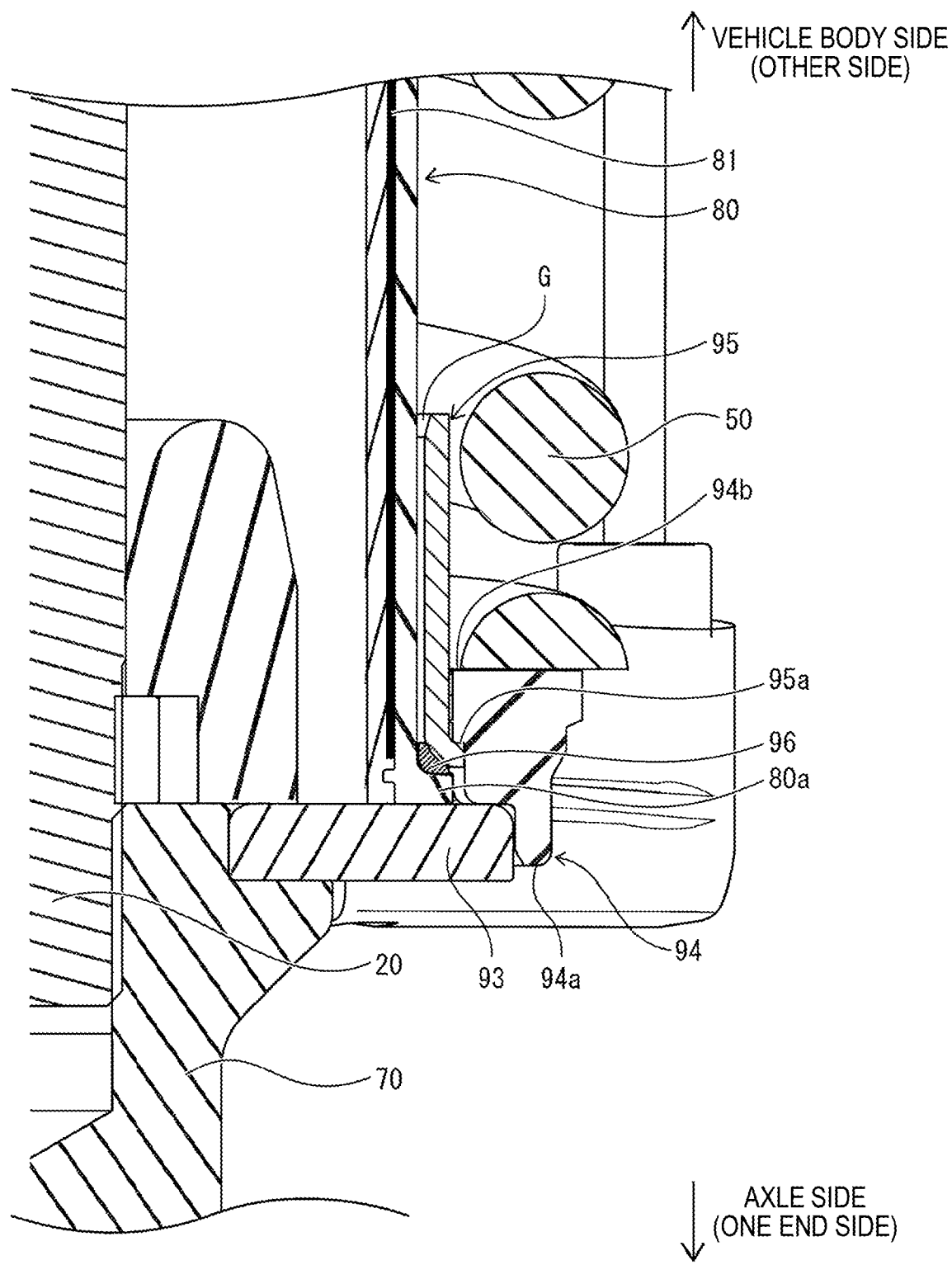
FIG. 2 is an enlarged cross-sectional view illustrating a part of the shock absorber.

FIG. 2 is an enlarged cross-sectional view illustrating a part of the shock absorber 1. As illustrated in FIG. 2, at the axle-side (one end side) end portion of the protector 80, a flange portion 80a (extending portion) and a terminal portion 80b are provided. The flange portion 80a is formed to extend in a radial direction of the protector 80 and in a direction away from the piston rod 20. In the terminal portion 80b, an end portion of a signal line 82 electrically connecting the coil 81 and the stroke measuring device 100 is disposed. In the terminal portion 80b, both ends of the coil 81 and the signal line 82 are electrically connected.

As illustrated in FIG. 1, the spring receiving mechanism 90 has a spring receiving portion 91 provided on the vehicle body side and a spring receiving portion 92 provided on the axle side. The spring receiving portion 91 is fixed to the vehicle body side of the cylinder 10 so as to receive the load of the suspension spring 50 on the vehicle body side. The spring receiving portion 92 is fixed to the axle side of the shock absorber 1 so as to receive the load of the suspension spring 50 on the axle side.

As illustrated in FIG. 2, the spring receiving portion 92 includes a sheet stopper 93 (supporting member), a spring receiver 94, an auxiliary member 95 (cylindrical member), and an O-ring 96 (elastic body).

Figure 3:
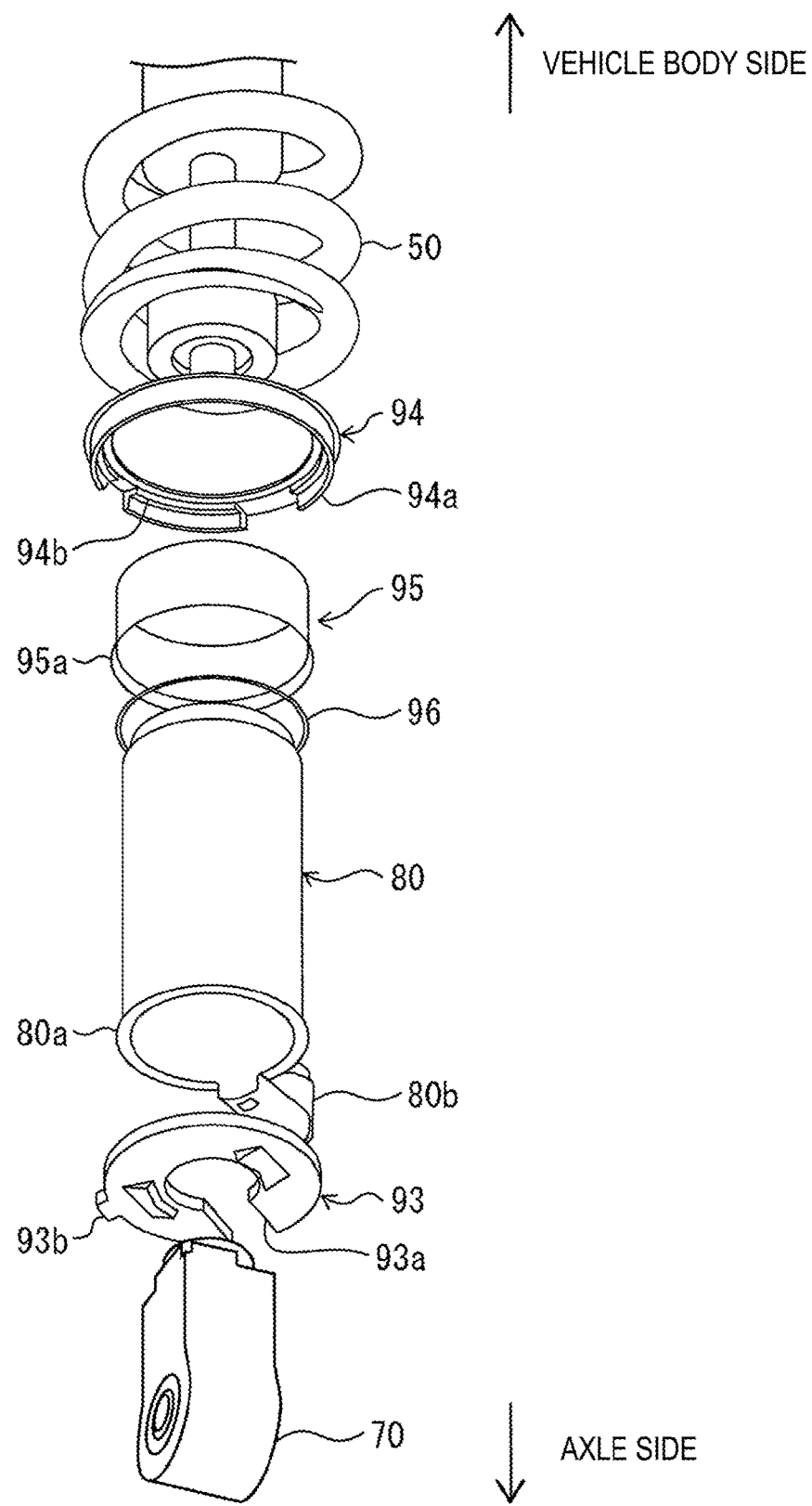
FIG. 3 is an exploded perspective view illustrating a configuration of an axle side of the shock absorber.

FIG. 3 is an exploded perspective view illustrating a configuration of the axle side of the shock absorber 1. As illustrated in FIG. 3, the sheet stopper 93 is a flat and annular member having a predetermined width and has an outer diameter larger than the outer diameter of the flange portion 80a of the protector 80. The sheet stopper 93 is fixed by being fitted to the vehicle-body-side end portion of the attachment member 70 at the inner peripheral end surface. The sheet stopper 93 is disposed so as to block a part of an axle-side opening portion of the protector 80 while being fixed to the attachment member 70.

Figure 4:
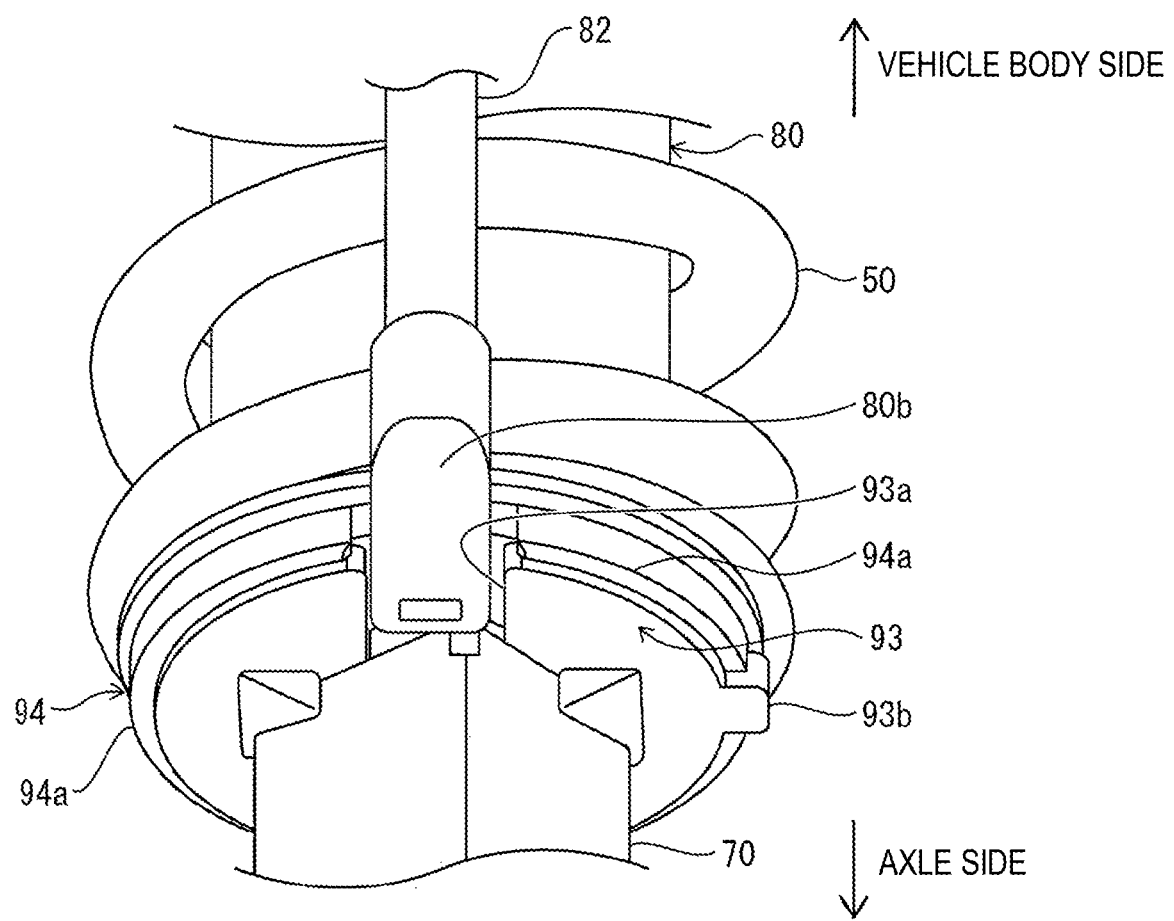
FIG. 4 is an enlarged perspective view illustrating a part of the shock absorber.

The sheet stopper 93 has a C shape by having one notch portion 93a. FIG. 4 is an enlarged perspective view illustrating a part of the shock absorber 1. As illustrated in FIG. 4, the notch 93a is formed to correspond to the shape of the terminal portion 80b so as to form a region in which the terminal portion 80b of the protector 80 is disposed.

By inserting the terminal portion 80b into the notch portion 93a, the opening amount of the sheet stopper 93 in the vicinity of the terminal portion 80b can be reduced.

The sheet stopper 93 may have an edge portion which defines a space for inserting the terminal portion 80b and may have an opening portion (not illustrated) instead of the notch portion 93a.

The sheet stopper 93 has a protrusion portion 93b, which regulates the rotation of the sheet stopper 93 with respect to the spring receiver 94, at the outer peripheral end edge. The protrusion portion 93b is provided at a position spaced apart from the notch portion 93a by a predetermined distance.

The spring receiver 94 is an annular member provided to receive the spring load of the suspension spring 50. The spring receiver 94 is provided with a plurality of extending walls 94a extending from the outer peripheral surface of the spring receiver 94 toward the axle side. The extending walls 94a are spaced in the circumferential direction of the spring receiver 94. As illustrated in FIG. 4, the terminal portion 80b is disposed between two adjacent extending walls 94a and the protrusion portion 93b is disposed between the other two adjacent extending walls 94a.

As illustrated in FIG. 2, the spring receiver 94 is fixed to the sheet stopper 93 with the axle-side end surface in the spring receiver 94 in contact with the vehicle-body-side end surface in the sheet stopper 93 and the inner wall surface of the extending wall 94a in contact with the outer peripheral surface of the sheet stopper 93. Further, the vehicle-body-side end surface of the spring receiver 94 is in contact with the axle-side end portion in the suspension spring 50. The spring receiver 94 receives the load of the suspension spring 50 on the axle side of the piston rod 20 by such a structure.

The spring receiver 94 has a step portion 94b which is recessed radially further outward than the inner peripheral surface of the vehicle-body-side end portion of the spring receiver 94. The step portion 94b is formed over the entire inner periphery of the spring receiver 94.

The auxiliary member 95 is a cylindrical member disposed on the axle side (one end side) of the protector 80 and has an inner diameter larger than the outer diameter of the protector 80. At the axle-side end portion of the auxiliary member 95, the flange portion 95a is provided. The auxiliary member 95 may be integrally formed with the spring receiver 94. Further, since the auxiliary member 95 is not essential in the embodiment, it may be omitted.

The flange portion 95a is formed to extend in the radial direction of the auxiliary member 95 and in a direction away from the piston rod 20. The flange portion 95a is locked to the step portion 94b of the spring receiver 94. Thereby, the movement of the auxiliary member 95 to the vehicle body side is restrained by the step portion 94b.

The flange portion 80a of the protector 80 is inserted in a space S facing the flange portion 95a, the step portion 94b, and the vehicle-body-side end surface of the sheet stopper 93. The space S has a volume larger than the volume of the flange portion 80*a* and the flange portion 80*a* has a movable size in the radial direction of the piston rod 20.

The O-ring 96 is an annular member having elasticity, and is disposed in the space S (more specifically, between the outer peripheral surface of the protector 80 and the inner peripheral surface of the auxiliary member 95). By this configuration, the O-ring 96 urges the protector 80 to the side where the piston rod 20 is located in the space S. Therefore, a gap G is formed between the outer peripheral surface of the protector 80 and the inner peripheral surface of the auxiliary member 95.

Thus, the spring receiver 94 and the flange portion 80*a* are separated by the space S. Therefore, the load of the suspension spring 50 can be prevented from being applied to the protector 80 via the spring receiver 94, and thus the possibility that the protector 80 may be damaged by the load can be reduced. When the protector 80 is damaged, the coil 81 inside the protector 80 may be broken, and thus there is possibility that the stroke sensor system 101 may not function. By preventing the protector 80 from being damaged, the breakage of the coil 81 can be prevented, and thus the durability of the stroke sensor system 101 can be enhanced.

Also, even when the piston rod 20 is bent by applying a bending moment to the shock absorber 1, displacement of protector 80 is allowed since the space S and the gap G are formed. As a result, it is possible to reduce the load applied to the protector 80. Therefore, the possibility of damage to the protector 80 can be further reduced.

Also, by providing the O-ring 96, an effect of preventing unnecessary displacement of the protector 80 in the space S can be obtained.

<Configuration of Stroke Sensor System 101>

As illustrated in FIG. 1, the coil 81 of the shock absorber 1 is connected to the stroke measuring device 100 via the signal line 82. The stroke measuring device 100 is realized by, for example, a control device or the like provided in a vehicle.

Figure 5:
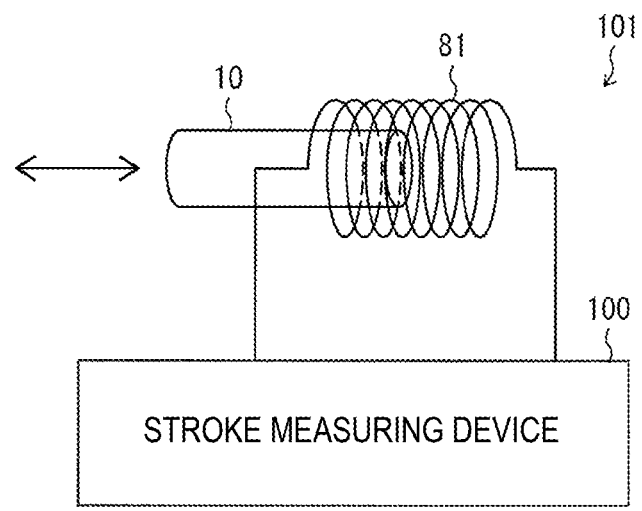
FIG. 5 is a view illustrating a configuration of a stroke sensor system connected to the shock absorber.

FIG. 5 is a view illustrating the configuration of the stroke sensor system 101 connected to the shock absorber 1. As illustrated in FIG. 5, the stroke sensor system 101 includes the cylinder 10, the coil 81, and the stroke measuring device 100.

The stroke measuring device 100 has a capacitor (not illustrated). The capacitor is electrically connected to the coil 81 to configure an LC oscillation circuit together with the coil 81. The resonant frequency of the LC oscillation circuit changes in accordance with the change in the stroke amount of the shock absorber 1.

The stroke measuring device 100 outputs a stroke amount by performing predetermined processing on an oscillation signal output from the LC oscillation circuit. For the processing described above, known processing disclosed in Patent Literature 1 and the like can be applied.

In the stroke sensor system 101, the fitting length in which the cylinder 10, which is a conductor, and the coil 81 are fitted varies according to the stroke amount of the shock absorber 1. When the shock absorber 1 extends, the fitting length becomes shorter, and when the shock absorber 1 shrinks, the fitting length becomes longer.

When an alternating current flows to the coil 81 when the fitting length changes, an eddy current is generated in the cylinder 10 so as to cancel the fluctuation of the magnetic field. Due to the action of the eddy current, the magnetic field generated around the coil 81 is reduced. That is, the inductance of the coil 81 is apparently reduced by the eddy current. When the fitting length is short (when the shock absorber 1 is extended), since the influence of the eddy current is small, the inductance becomes larger. On the other hand, when the fitting length is long (when the shock absorber 1 is contracted), the influence of the eddy current is large, so that the inductance becomes smaller.

A resonance frequency f0 of the LC oscillation circuit is expressed as $f0=1/(2\pi\sqrt{(LC)})$, where L is the inductance of the coil 81 and C is the capacitance of the capacitor. As a result, when the inductance L is large, the resonance frequency f0 becomes small, whereas when the inductance L is small, the resonance frequency f0 becomes large. Therefore, the stroke amount of the shock absorber 1 can be obtained from the resonance frequency.

<Effect of Shock Absorber 1>

As described above, the shock absorber 1 includes the cylinder 10, which is a conductor, the piston rod 20 which is inserted into one end side of the cylinder 10, the suspension spring 50 which is disposed outside the cylinder 10, the spring receiver 94 which receives the load of the suspension spring 50, and the protector 80 for protecting the piston rod 20. The protector 80 has the coil 81 for detecting the relative position between the cylinder 10 and the protector 80. An end portion formed on the one end side of the protector 80 is arranged so as not to receive the load from the spring receiver 94. Specifically, a member (sheet stopper 93) different from the protector 80 which directly receives the load from the spring receiver 94 is provided. The member different from the protector 80 forms a part of the space S which receives the one-end-side end portion of the protector 80. Alternatively, as shown in a second embodiment, the spring receiver 94 may form the space S.

The protector 80 located on one end side of the cylinder 10 has the coil 81 for detecting the relative position between the cylinder 10 and the protector 80. When the relative positional relationship between the cylinder 10, which is a conductor, and the coil 81 changes, the inductance of the coil 81 changes according to the change. By detecting this change, the stroke (the relative position of the cylinder 10 with respect to the piston rod 20) of the shock absorber 1 can be detected.

The one-end-side end portion (flange portion 80*a*) of the protector 80 is arranged so as not to receive the load from the spring receiver 94. Therefore, when the load of the suspension spring 50 is applied to the protector 80, the possibility that the protector 80 is damaged and the coil 81 is disconnected can be reduced.

In addition, the space S for receiving the one-end-side end portion of the protector 80 is formed on one end side of the spring receiver 94. Also, the one-end-side end portion of the protector 80 has the flange portion 80*a* extending in the direction away from the piston rod 20 and the flange portion 80*a* is inserted into the space S.

By inserting the flange portion 80*a* formed at the one-end-side end portion of the protector 80 into the space S formed at one end side of the spring receiver 94, a structure in which the load of the suspension spring 50 is not directly applied to the protector 80 via the spring receiver 94 can be realized.

The space has a size that allows the flange portion 80*a* to move in the radial direction of the piston rod 20.

Since the flange portion 80*a* of the protector 80 can move in the radial direction of the piston rod 20 in the space, the protector 80 can move in the radial direction of the piston rod 20 even when a bending moment is applied to the piston rod 20. Therefore, it is possible to prevent the protector 80 from being loaded by the bending moment.

Further, the O-ring 96 for urging the protector 80 is arranged in the space.

Since the protector 80 is urged in a predetermined direction by the O-ring 96, it is possible to prevent the protector 80 from being unnecessarily displaced (shake).

The protector 80 has a cylindrical shape and the shock absorber 1 further includes the sheet stopper 93. The sheet stopper 93 is disposed on one end side of the protector 80, has a larger diameter than the protector 80, and supports the spring receiver 94 on the outside of the protector 80, and at least a part of the space S is formed by the spring receiver 94 and the sheet stopper 93.

By forming a space for inserting the flange portion 80a of the protector 80 at a portion facing the spring receiver 94 and the sheet stopper 93, the shape of the part can be made simpler than when the space S is formed inside the spring receiver 94. Therefore, the shock absorber 1 can be easily assembled.

Further, the terminal portion 80b for outputting a signal from the coil 81 is provided on the one end side of the protector 80 and the sheet stopper 93 is arranged so as to block a part of the one-end-side opening portion of the protector 80 and has the notch portion 93a or an opening portion corresponding to the shape of the terminal portion 80b.

By inserting the terminal portion 80b of the protector 80 into the notch portion 93a or the opening portion formed in the sheet stopper 93, the opening amount of the sheet stopper 93 in the vicinity of the terminal portion 80b can be reduced.

The shock absorber 1 further includes the auxiliary member 95 extending from the spring receiver 94 to the other end side along the axial direction of the piston rod 20 and the gap G is formed between the inner peripheral surface of the auxiliary member 95 and the outer peripheral surface of the protector 80.

By providing the auxiliary member 95 in addition to the spring receiver 94, the suspension spring 50 can be stably supported. In addition, since the gap G is formed between the auxiliary member 95 and the protector 80, even when a bending moment is applied to the piston rod 20, it is possible to prevent the auxiliary member 95 and the protector 80 from coming into contact with each other and being damaged.

Second Embodiment

Another embodiment of the invention will be described below. The same members as those in the first embodiment are denoted by the same reference numerals and letters and the description thereof is omitted.

Figure 6:
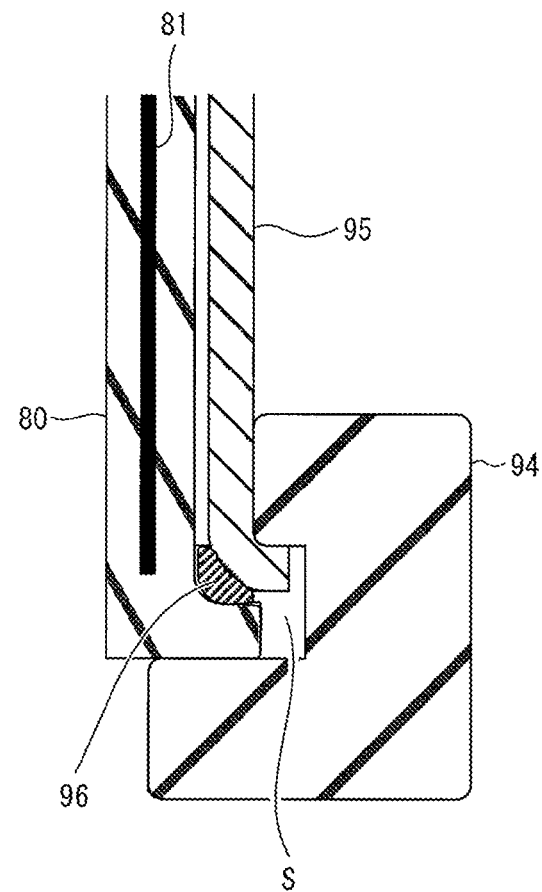
FIG. 6 is an enlarged cross-sectional view illustrating a part of a shock absorber according to a second embodiment.

FIG. 6 is an enlarged cross-sectional view of a part of a shock absorber 1 according to a second embodiment. As illustrated in FIG. 6, the space S into which the flange portion 80a of the protector 80 is inserted may be formed inside the spring receiver 94.

Even in the configuration in which a recess portion defining the space S is formed on the inner peripheral surface of the spring receiver 94, by inserting the flange portion 80a into the space S, it is possible to realize a structure in which the load of the suspension spring 50 is not directly applied to the protector 80 via the spring receiver 94.

<Additional Notes>

In the embodiment described above, the configuration in which the cylinder 10 is arranged on the vehicle body side and the protector 80 is arranged on the axle side has been described. However, the arrangement relationship between the cylinder 10 and the protector 80 may be reversed.

The invention is not limited to the embodiments described above and various modifications are possible within the scope of the claims. Embodiments obtained by appropriately combining technical means disclosed in different embodiments are also included in the technical scope of the invention.

REFERENCE SIGNS LIST 1 shock absorber
10 cylinder (conductor)
20 piston rod (rod)
50 suspension spring
80 protector (protective member)
81 coil
93 sheet stopper (support member)
93a notch portion
94 spring receiver
95 auxiliary member (cylindrical member)
96 O-ring (elastic body)
G gap
S space

The invention claimed is:

1. A shock absorber, comprising:
a cylinder which is a conductor;
a rod inserted into the cylinder from an axle side of the cylinder;
a suspension spring arranged outside the cylinder;
a spring receiver which receives a load of the suspension spring on an axle side of the rod; and
a protective member arranged on the axle side of the rod and configured to protect the rod, wherein
the protective member has a coil configured to detect a relative position between the cylinder and the protective member,
an end portion formed on an axle side of the protective member is arranged so as not to directly receive a load from the spring receiver, and
the end portion is disposed between top and bottom surfaces of the spring receiver in an axial direction of the rod.

2. The shock absorber according to claim 1, wherein
a space for receiving the end portion formed on the axle side of the protective member is formed inside the spring receiver or on an axle side of the spring receiver, and
the end portion formed on the axle side of the protective member has an extending portion extending in a direction away from the rod and the extending portion is inserted into the space.

3. The shock absorber according to claim 2, wherein
the space has a size such that the extending portion is movable in a radial direction of the rod.

4. The shock absorber according to claim 2, wherein
an elastic body which urges the protective member is disposed in the space.

5. The shock absorber according to claim 2, wherein
the protective member is cylindrical,
a support member disposed on the axle side of the protective member, having a larger diameter than the protective member, and supporting the spring receiver on the outside of the protective member is further provided, and
at least a part of the space is formed by the spring receiver and the support member.

6. The shock absorber according to claim 5, wherein a terminal portion configured to output a signal from the coil is provided on the axle side of the protective member, and the support member is arranged so as to block a part of an opening portion on the axle side of the protective member, and has a notch portion or an opening portion corresponding to a shape of the terminal portion.

7. The shock absorber according to claim 1, further comprising:
a cylindrical member extending from the spring receiver to a vehicle body side along an axial direction of the rod, wherein
a gap is formed between an inner peripheral surface of the cylindrical member and an outer peripheral surface of the protective member.

8. The shock absorber according to claim 3, wherein an elastic body which urges the protective member is disposed in the space.

9. The shock absorber according to claim 3, wherein the protective member is cylindrical,
a support member disposed on the axle side of the protective member, having a larger diameter than the protective member, and supporting the spring receiver on the outside of the protective member is further provided, and
at least a part of the space is formed by the spring receiver and the support member.

10. The shock absorber according to claim 9, wherein
a terminal portion configured to output a signal from the coil is provided on the axle side of the protective member, and
the support member is arranged so as to block a part of an opening portion on the axle side of the protective member, and has a notch portion or an opening portion corresponding to a shape of the terminal portion.

11. The shock absorber according to claim 2, further comprising:
a cylindrical member extending from the spring receiver to a vehicle body side along an axial direction of the rod, wherein
a gap is formed between an inner peripheral surface of the cylindrical member and an outer peripheral surface of the protective member.

12. The shock absorber according to claim 4, wherein the protective member is cylindrical,
a support member is disposed on the axle side of the protective member, has a larger diameter than the protective member, and supports the spring receiver on the outside of the protective member, and
at least a part of the space is formed by the spring receiver and the support member.

13. The shock absorber according to claim 12, wherein
a terminal portion configured to output a signal from the coil is provided on the axle side of the protective member, and
the support member is arranged so as to block a part of an opening portion on the axle side of the protective member, and has a notch portion or an opening portion corresponding to a shape of the terminal portion.

14. The shock absorber according to claim 3, further comprising:
a cylindrical member extending from the spring receiver to a vehicle body side along an axial direction of the rod, wherein
a gap is formed between an inner peripheral surface of the cylindrical member and an outer peripheral surface of the protective member.

15. The shock absorber according to claim 8, wherein the protective member is cylindrical,
a support member is disposed on the axle side of the protective member, has a larger diameter than the protective member, and supports the spring receiver on the outside of the protective member, and
at least a part of the space is formed by the spring receiver and the support member.

16. The shock absorber according to claim 15, wherein
a terminal portion configured to output a signal from the coil is provided on the axle side of the protective member, and
the support member is arranged so as to block a part of an opening portion on the axle side of the protective member, and has a notch portion or an opening portion corresponding to a shape of the terminal portion.

17. The shock absorber according to claim 4, further comprising:
a cylindrical member extending from the spring receiver to a vehicle body side along an axial direction of the rod, wherein
a gap is formed between an inner peripheral surface of the cylindrical member and an outer peripheral surface of the protective member.

18. The shock absorber according to claim 5, further comprising:
a cylindrical member extending from the spring receiver to a vehicle body side along an axial direction of the rod, wherein
a gap is formed between an inner peripheral surface of the cylindrical member and an outer peripheral surface of the protective member.

19. The shock absorber according to claim 6, further comprising:
a cylindrical member extending from the spring receiver to a vehicle body side along an axial direction of the rod, wherein
a gap is formed between an inner peripheral surface of the cylindrical member and an outer peripheral surface of the protective member.

20. A shock absorber, comprising:
a cylinder which is a conductor;
a rod inserted into the cylinder from an axle side of the cylinder;
a suspension spring arranged outside the cylinder;
a spring receiver which receives a load of the suspension spring on an axle side of the rod; and
a protective member arranged on the axle side of the rod and configured to protect the rod, wherein
the protective member has a coil configured to detect a relative position between the cylinder and the protective member,
an end portion formed on an axle side of the protective member is arranged so as not to directly receive a load from the spring receiver,
a space for receiving the end portion formed on the axle side of the protective member is formed inside the spring receiver or on an axle side of the spring receiver,
the end portion formed on the axle side of the protective member has an extending portion extending in a direction away from the rod and the extending portion is inserted into the space, and
an elastic body which urges the protective member is disposed in the space.

* * * * *